United States Patent
Ohmori et al.

(10) Patent No.: US 8,620,599 B2
(45) Date of Patent: Dec. 31, 2013

(54) MEMBRANE TENSION MEASURING APPARATUS

(75) Inventors: Hiroshi Ohmori, Nagoya (JP); Sang-Wook Jin, Nagoya (JP); Nobuhiko Ishizu, Osaka (JP); Fumiyoshi Takeda, Osaka (JP); Jun Fujiwara, Osaka (JP)

(73) Assignees: National University Corporation Nagoya University (JP); Taiyo Kogyo Corporation (JP)

( * ) Notice: Subject to any disclaimer, the term of this patent is extended or adjusted under 35 U.S.C. 154(b) by 342 days.

(21) Appl. No.: 13/145,361

(22) PCT Filed: Jan. 21, 2010

(86) PCT No.: PCT/JP2010/050702
§ 371 (c)(1),
(2), (4) Date: Jul. 20, 2011

(87) PCT Pub. No.: WO2010/087266
PCT Pub. Date: Aug. 5, 2010

(65) Prior Publication Data
US 2011/0288792 A1 Nov. 24, 2011

(30) Foreign Application Priority Data
Jan. 27, 2009 (JP) ................... 2009-015922

(51) Int. Cl.
*G06F 19/00* (2011.01)
(52) U.S. Cl.
USPC .......................................... 702/43
(58) Field of Classification Search
USPC .......................................... 702/43
See application file for complete search history.

(56) References Cited

U.S. PATENT DOCUMENTS

| 4,833,928 A | 5/1989 | Luukkala et al. |
| 2008/0212407 A1* | 9/2008 | Caliano et al. ............ 367/140 |

FOREIGN PATENT DOCUMENTS

| CN | 1735285 | 2/2006 |
| JP | 62-293130 | 12/1987 |
| JP | 3095424 | 4/1991 |
| JP | 5-196522 | 8/1993 |
| JP | 2001-174365 | 6/2001 |
| JP | 2002-90238 | 3/2002 |

OTHER PUBLICATIONS

SangWook Jin, et al. "Developement of Measurement Equipment of Membrane Stress for Membrane Structures using White Noise Sound Wave"—AIJ J. Technol. Des., Architectural Institute of Japan, Dec. 20, 2007, vol. 13, No. 26, pp. 511-516.

* cited by examiner

*Primary Examiner* — Bryan Bui
(74) *Attorney, Agent, or Firm* — Gerald E. Hespos; Michael J. Porco; Matthew T. Hespos (57) ABSTRACT

A membrane tension measuring apparatus comprises: a rectangular frame (5) adapted to be abuttable on a surface (4) of a membrane (2) to which tension (Tx, Ty) is applied; an acoustic wave generator (17) operable to emit an acoustic wave (16) toward a part (2a) of the membrane (2) surrounded by the frame (5); a vibration detector (24) operable to detect vibration which is induced in the part (2a) of the membrane (2) by the emitted acoustic wave (16); and a processor (29) operable to calculate the tension (Tx, Ty) based on vibration data detected by the vibration detector (24). Each of the acoustic wave generator (17), the vibration detector (24) and the processor (29) is mounted to the frame (5).

10 Claims, 6 Drawing Sheets

//MEMBRANE TENSION MEASURING APPARATUS

BACKGROUND OF THE INVENTION

1. Field of the Invention

The present invention relates to a membrane tension measuring apparatus designed to cause a membrane to vibrate according to acoustic wave so as to measure tension which is applied to the membrane.

2. Description of the Related Art

A building having a membrane structure includes, for example, a baseball stadium, a gymnasium and a pavilion. In this type of building, a membrane constituting a main part of the membrane structure has flexibility when it is in a free state. Therefore, during completion of the building, a uniform tension (N/cm) is applied as an initial load to the membrane of the membrane structure, along a surface of the membrane. This allows the membrane to be maintained (retained) in a given shape and imparted with stiffness for preventing easy deformation due to a load such as wind or snow.

Meanwhile, generally, as time passes after the completion of the building, the membrane is more apt to undergo loosening in the surface direction. Due to the loosening, internal stress of the membrane caused by the tension will decrease, i.e., the tension will decrease. The decrease in tension is undesirable because it is likely to give rise to excessive slack in the membrane, which causes a problem, such as fluttering or ponding.

Thus, as a prerequisite to adequately maintaining the membrane over a long period of time, it is important to know tension applied to the membrane, at intervals of a given elapsed time after the completion of the building. Therefore, there has heretofore been known a membrane tension measuring apparatus designed to allow measurement of the tension, as disclosed in JP 2002-090238A.

According to JP 2002-090238A, the membrane tension measuring apparatus comprises a rectangular frame adapted to be abuttable on a surface of a membrane to which a uniform tension is applied, an acoustic wave generator operable to emit an acoustic wave toward a part of the membrane surrounded by the frame, a vibration detector operable to detect vibration which is induced in the part of the membrane by the emitted acoustic wave; and a processor operable to calculate the tension based on vibration data detected by the vibration detector.

When a measurement task for measuring tension in a membrane is carried out using the above membrane tension measuring apparatus, the frame is firstly placed to abut on a surface of the membrane. Subsequently, an acoustic wave is emitted from the acoustic wave generator toward a part of the membrane surrounded by the frame. Thus, the emitted acoustic wave causes the part of the membrane to vibrate, and the resulting vibration is detected by the vibration detector. Then, through the processor, a resonant (natural) vibration frequency of the part of the membrane is figured out based on vibration data detected by the vibration detector, and the tension is calculated based on the resonant vibration frequency and output. This makes it possible to know the tension and thereby adequately maintain the membrane.

Meanwhile, in the membrane tension measuring apparatus disclosed in JP 2002-090238A, the frame, the acoustic wave generator, the vibration detector and the processor are provided separately with respect to each other. Therefore, in the tension measurement task using the membrane tension measuring apparatus, a measurer is required to support the above components individually. However, the measurement task, particularly, at a high location or a location with poor footing in a building, etc., is likely to become complicated. In this respect, a need for further improvement still remains.

SUMMARY OF THE INVENTION

It is an object of the present invention to provide a membrane tension measuring apparatus which makes it easy to carry out a measurement task for measuring tension in a membrane.

According to one aspect of the present invention, there is provided a membrane tension measuring apparatus which comprises: a rectangular frame adapted to be abuttable on a surface of a membrane to which tension is applied; an acoustic wave generator operable to emit an acoustic wave toward a part of the membrane surrounded by the frame; a vibration detector operable to detect vibration which is induced in the part of the membrane by the emitted acoustic wave; and a processor operable to calculate the tension based on vibration data detected by the vibration detector, wherein each of the acoustic wave generator, the vibration detector and the processor is mounted to the frame.

DETAILED DESCRIPTION OF THE PREFERRED EMBODIMENTS

A membrane tension measuring apparatus according to one embodiment of the present invention comprises: a rectangular frame adapted to be abuttable on a surface of a membrane to which a uniform tension is applied; an acoustic wave generator operable to emit an acoustic wave toward a part of the membrane surrounded by the frame; a vibration detector operable to detect vibration which is induced in the part of the membrane by the emitted acoustic wave; and a processor operable to calculate the tension based on vibration data detected by the vibration detector. Each of the acoustic wave generator, the vibration detector and the processor is mounted to the frame.

With reference to the drawings, the embodiment of the present invention will now be specifically described.

Figure 1:
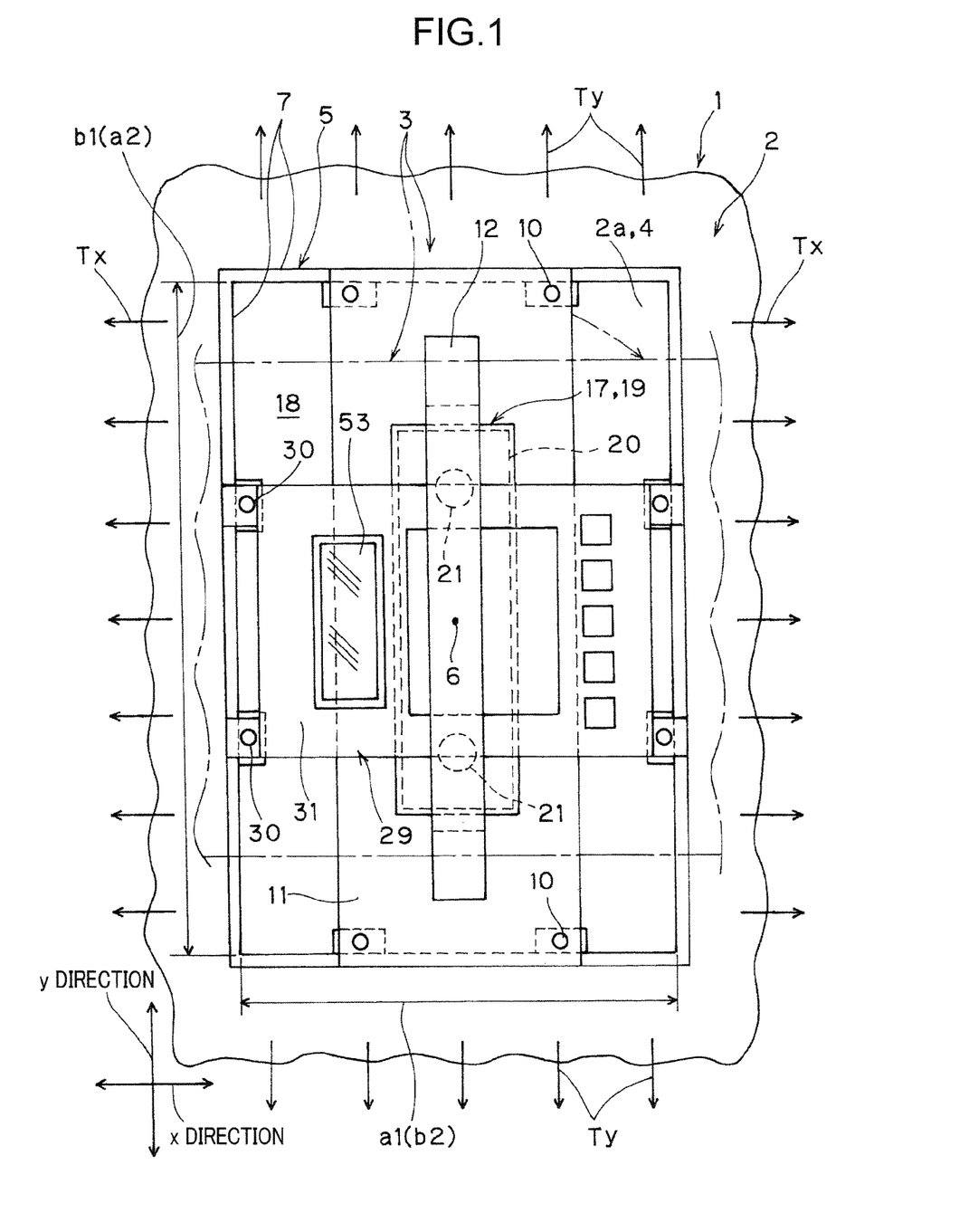
FIG. 1 is a top plan view of a membrane tension measuring apparatus according to one embodiment of the present invention.
Figure 2:
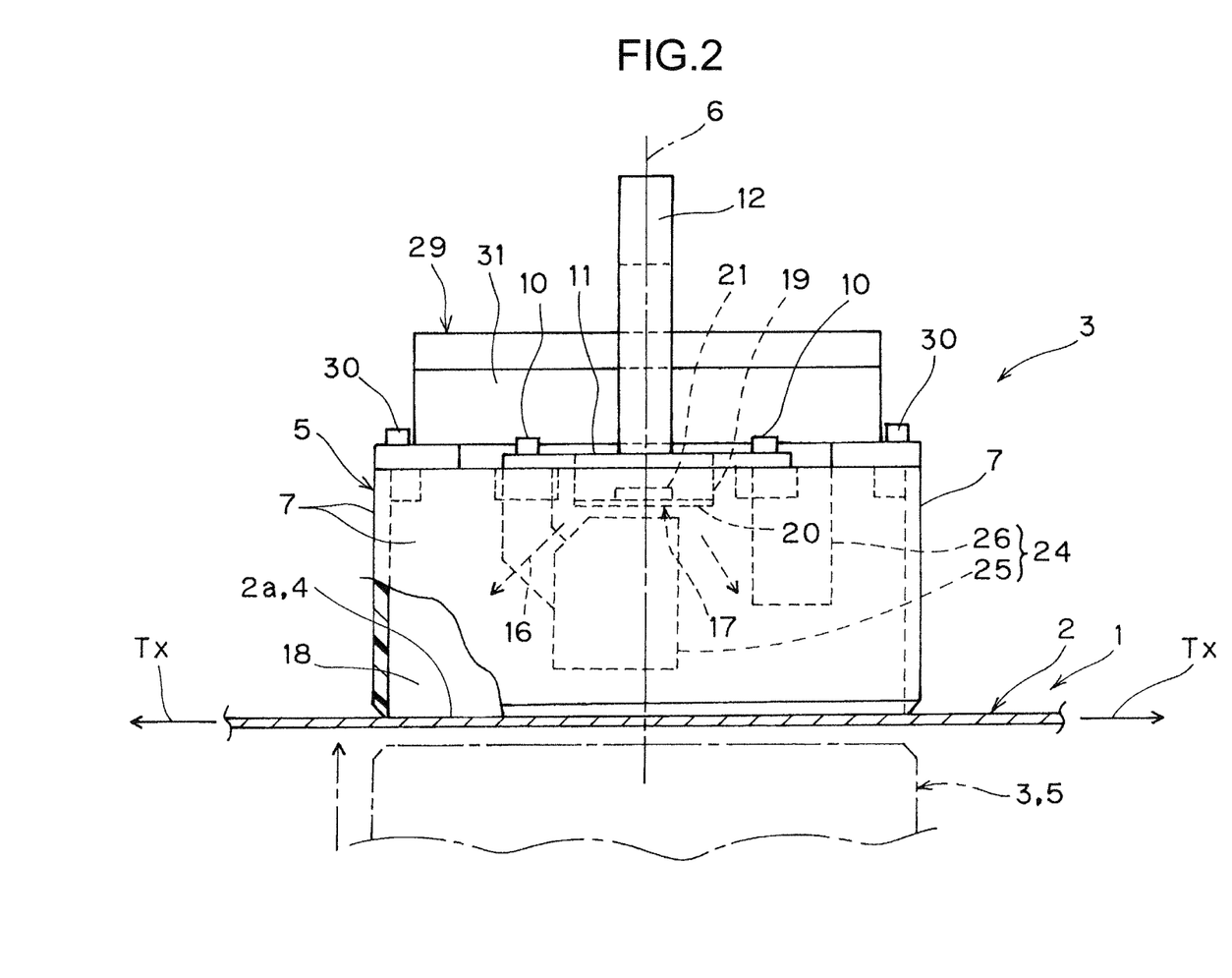
FIG. 2 is a front view of the membrane tension measuring apparatus.
Figure 3:
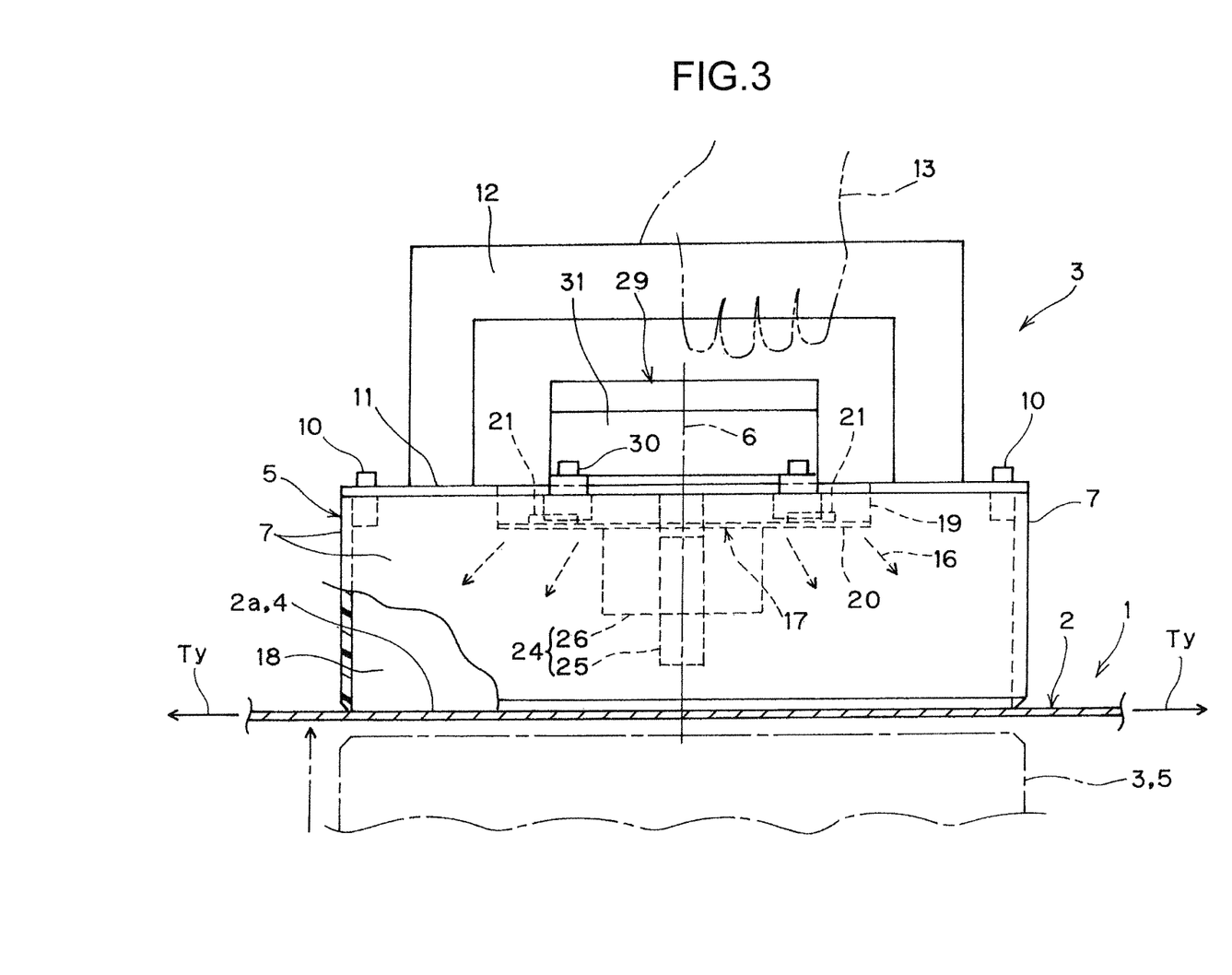
FIG. 3 is a side view of the membrane tension measuring apparatus.

In FIGS. 1 to 3, the reference numeral 1 indicates a building 1 having a membrane structure. A membrane 2 in the membrane structure (tent) of the building 1 is disposed to extend horizontally.

A candidate membrane 2 suitable for a measurement using the membrane tension measuring apparatus according to this embodiment is not particularly limited. For example, any film or sheet type of membrane made of resin or rubber can be subjected to the measurement using the apparatus. The film or sheet may be prepared by coating a substrate comprised of a woven or knitted fabric, with resin or rubber.

Preferably, the resin is one or a mixture of two or more selected from the group consisting of vinyl chloride resin, polyethylene, polypropylene, ethylene-vinyl acetate copolymer, polyurethane, fluororesin, polystyrene, acrylonitrile-butadiene-styrene copolymer, polyamide, acrylic resin, polycarbonate, and methylpentene resin. Preferably, the rubber is one selected from the group consisting of chloroprene rubber, chlorosulfonated polyethylene rubber, natural rubber, butadiene rubber, styrene rubber, butyl rubber, nitrile rubber, acrylic rubber, urethane rubber, silicone rubber, fluororubber, and ethylene-propylene rubber.

Preferably, the woven or knitted fabric is made of one or a mixture of two or more selected from the group consisting of: a natural fiber, such as kenaf or jute; a synthetic fiber, such as polyamide-based fiber, polyaramid-based fiber, polyester-based fiber, polyvinyl chloride-based fiber, polyvinylidene chloride-based fiber, acrylic-based fiber, polyvinyl alcohol-based fiber, polypropylene-based fiber, or polyethylene-based fiber; and an inorganic fiber, such as glass fiber, silica fiber, or basalt fiber.

If the membrane is transparent or semi-transparent, it is likely that laser light radiated from an after-mentioned vibration detector 24 penetrates through the membrane, and thereby no reflected light can be detected. In this case, an opaque member, such as an opaque tape, may be adhesively attached to a surface of the membrane at a position to be irradiated with the laser light. This makes it possible to detect reflected light so as to perform a tension measurement.

First and second uniform tensions Tx, Ty (N/cm) are applied to the membrane 2, respectively, in two orthogonal directions (x and y directions) along the surface of the membrane 2. Based on applying the tensions Tx, Ty to the membrane 2, the membrane 2 is maintained in a given shape, and imparted with stiffness for resisting to a load such as wind or snow.

A membrane tension measuring apparatus 3 for measuring the tensions Tx, Ty applied to the membrane 2 comprises a rectangular frame 5 adapted to be abuttable on an upper region of the surface 4 of the membrane 2. The frame 5 is formed in an axially-short angular cylindrical shape which has an axis 6 extending vertically to perpendicularly intersect the membrane 2. In a top plan view of the membrane tension measuring apparatus 3, the frame 5 has a rectangular in which a short side extends in the x direction. Each of four wall plates 7 constituting the frame 5 is formed from a transparent acrylic resin plate. In the top plan view of the membrane tension measuring apparatus 3, the frame 5 has an x-directional inner width dimension of 20 cm, a y-directional inner width dimension of 30 cm and a height dimension of 10 cm.

The frame 5 is placed on the membrane 2 in such a manner that a lower end surface thereof abuts on the surface 4. The membrane tension measuring apparatus 3 comprises a flat plate-shaped bracket 11 which is disposed to extend horizontally and across an upper end of the frame 5 (i.e., between respective upper ends of a pair of opposed ones of the wall plates), and fixed to the upper end by a fastener 10. FIG. 1 illustrates an example where the bracket 11 is set to extend in the y direction.

The membrane tension measuring apparatus 3 further comprises a portal-shaped grip which is provided to protrude upwardly from an upper surface of the bracket 11. The grip 12 is configured to be grippable by a measurer 13 who intends to carry out a measurement task for measuring the tensions Tx, Ty, using the membrane tension measuring apparatus 3. Each of the bracket 11 and the grip 12 is formed as a black alumite-coated component.

The membrane tension measuring apparatus 3 is equipped with an acoustic wave generator 17 which is mounted to the frame 5 through the bracket 11. The acoustic wave generator 17 is operable to emit an acoustic wave 16 toward a rectangular part 2a of the membrane 2 surrounded by the frame 5. In this embodiment, the acoustic wave generator 17 is comprised of a flat-panel speaker. The acoustic wave generator 17 comprises: a housing 19 which extends along an upper end region of an internal space 18 of the frame 5 while being supported by the bracket 11, and has an opening oriented toward the part 2a of the membrane 2 located therebelow; a rectangular-shaped flat panel 20 mounted to the housing 19 to close the opening of the housing 19; and a vibrating element 21 installed inside the housing 19 on the side of an upper surface of the flat panel 20.

The flat panel 20 is formed in an oblong shape, and located in a central region of the internal space 18 of the membrane tension measuring apparatus 3 in the top plan view of the membrane tension measuring apparatus 3. The flat panel 20 has a short side and a long side each extending parallel to a respective one of the short side and a long side defining inner dimensions of the frame 5. Further, the flat panel 20 is disposed parallel to the lower end of the frame 7 (the lower ends of the wall plates 7). In other words, the flat panel 20 is disposed to extend parallel to the part 2a of the membrane 2. For example, the flat panel 20 is formed from a resin plate such as an acrylic resin plate, or a sheet metal.

The vibrating element 21 is adapted to vibrate in accordance with an external electrical signal, and transmit the resulting vibration to the flat panel 20 so as to cause the flat panel 20 to emit the acoustic wave 16. The energy of the acoustic wave 16 causes the part 2a of the membrane 2 to vibrate. In other words, the acoustic wave is transmitted under a condition that the flat panel 20 and the part 2a of the membrane 2 are disposed in noncontact relation with each other.

Figure 4:
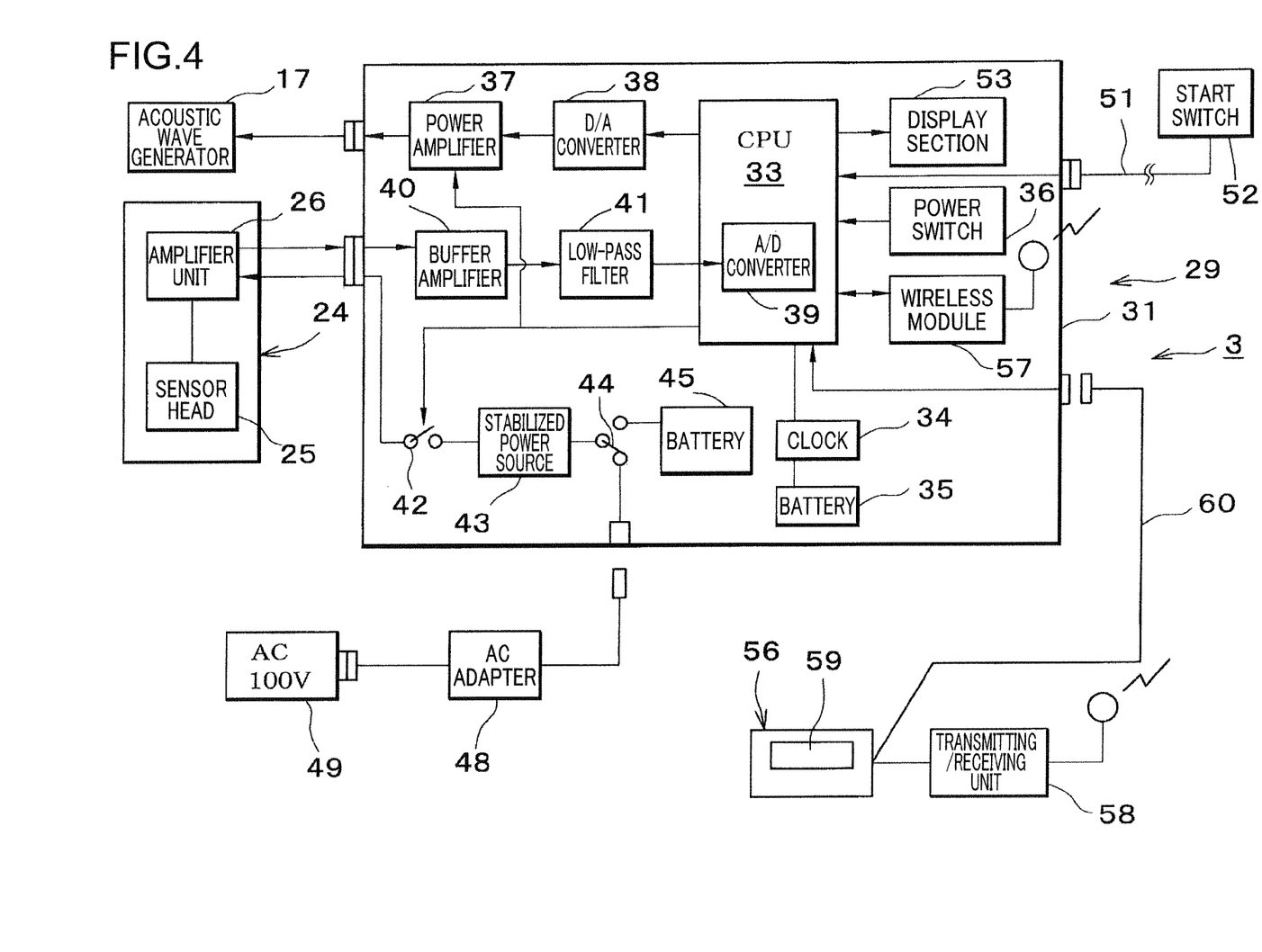
FIG. 4 is an electrical block diagram of the membrane tension measuring apparatus.

As illustrated in FIGS. 2 to 4, the membrane tension measuring apparatus 3 is equipped with a vibration detector 24 operable to detect natural vibration which is induced in the part 2a of the membrane 2 by the acoustic wave 16. The vibration detector 24 is a laser Doppler vibrometer which is operable to detect vibration of the part 2a of the membrane 2 in a noncontact manner. The vibration detector 24 is disposed in the internal space 18 of the frame 5 while being supported by the bracket 11. The vibration detector 24 comprises: a sensor head 25 which is disposed above and adjacent to the part 2a of the membrane 2, at a position on the axis 6 and between the acoustic wave generator 17 and the part 2a of the membrane 2; and an amplifier unit 26 electrically connected to the sensor head 25.

The membrane tension measuring apparatus 3 is equipped with a processor 29 operable to electronically calculate the tensions Tx, Ty based on vibration data detected by the vibration detector 24. The processor 29 comprises a housing 31 which is disposed across the upper end of the frame 5 and fixed to the upper end by a fastener 30. FIG. 1 illustrates an example where the housing 31 is installed to extend in the x direction at a position above and adjacent to the bracket 11.

As illustrated in FIG. 4, within the housing 31, the processor 29 is provided with the following components: a central control unit 33 having a storage device; a clock 34 connected to the central control unit 33; a lithium battery 35 serving as a power source; a power switch 36 for turning on/off an electric power supply from the battery 35 to the central control unit 33; a power amplifier 37 and a D/A converter 38 which connect therethrough the central control unit 33 and the acoustic wave generator 17 to allow an electric power supply from the battery 35 to the acoustic wave generator 17; a buffer amplifier 40 and a low-pass filter 41 which connect therethrough the amplifier unit 26 of the vibration detector 24 and an A/D converter 39 incorporated in the central control unit 33; a stabilized power source 43 connected to the amplifier unit 26 of the vibration detector 24 via a connect/disconnect switch 42; and a secondary battery 45 comprised of a rechargeable nickel-hydride battery and connected to the stabilized power source 43 via a change-over switch 44.

The stabilized power source 43 is adapted to be selectively connectable to and disconnectable from an external power source 49 which is a commercial AC (100 V) power source, via the change-over switch 44 and an AC adapter 48. A start switch 52 is connected to the central control unit 33 through an electric wire 51. The start switch 52 is provided outside the housing 31 to serve as a switch for allowing the central control unit 33 to start to be activated. Further, a display section 53, such as a liquid-crystal display, is provided in an upper surface of the housing 31. The display section 53 is adapted to display measurement data including a calculation result from the processor 29, in a manner visible to the measurer 13.

The measurement data including the calculation result from the processor 29 can be wirelessly transmitted to a receiver 56 which is comprised of a personal computer or terminal and located away from the processor 29. More specifically, a wireless module (communication module) 57 connected to the central control unit 33 is provided inside the housing 31 of the processor 29, and a transmitting/receiving unit 58 connected to the receiver 56 is provided outside the housing 31. The receiver 56 has a display section 59, such as a liquid-crystal display, which is adapted to display the received measurement data in a visible manner. Alternatively, the communication between the processor 29 and the receiver 56 may be performed through an electric wire 60. In other words, the processor 29 and the receiver 56 may be wiredly connected to each other.

Meanwhile, a per-unit area mass of the membrane 2, i.e., a $\rho_k$ value (kg/m$^2$), varies depending on types (e.g., A to C types) of candidate membranes 2 for the measurement. Therefore, the types of the candidate membranes 2 and respective $\rho_k$ values corresponding to the types are pre-stored in the processor 29 as a part of a set of initial conditions. In this case, the membrane tension measuring apparatus 3 is designed to allow arbitrary selection of one of the types of the candidate membranes 2 and a corresponding one of the $\rho_k$ values. Alternatively, it may be designed to allow the measurer 13 to input a $\rho_k$ value into the processor 29 in a manner corresponding to the type of the membrane 2, in each measurement.

Figure 5:
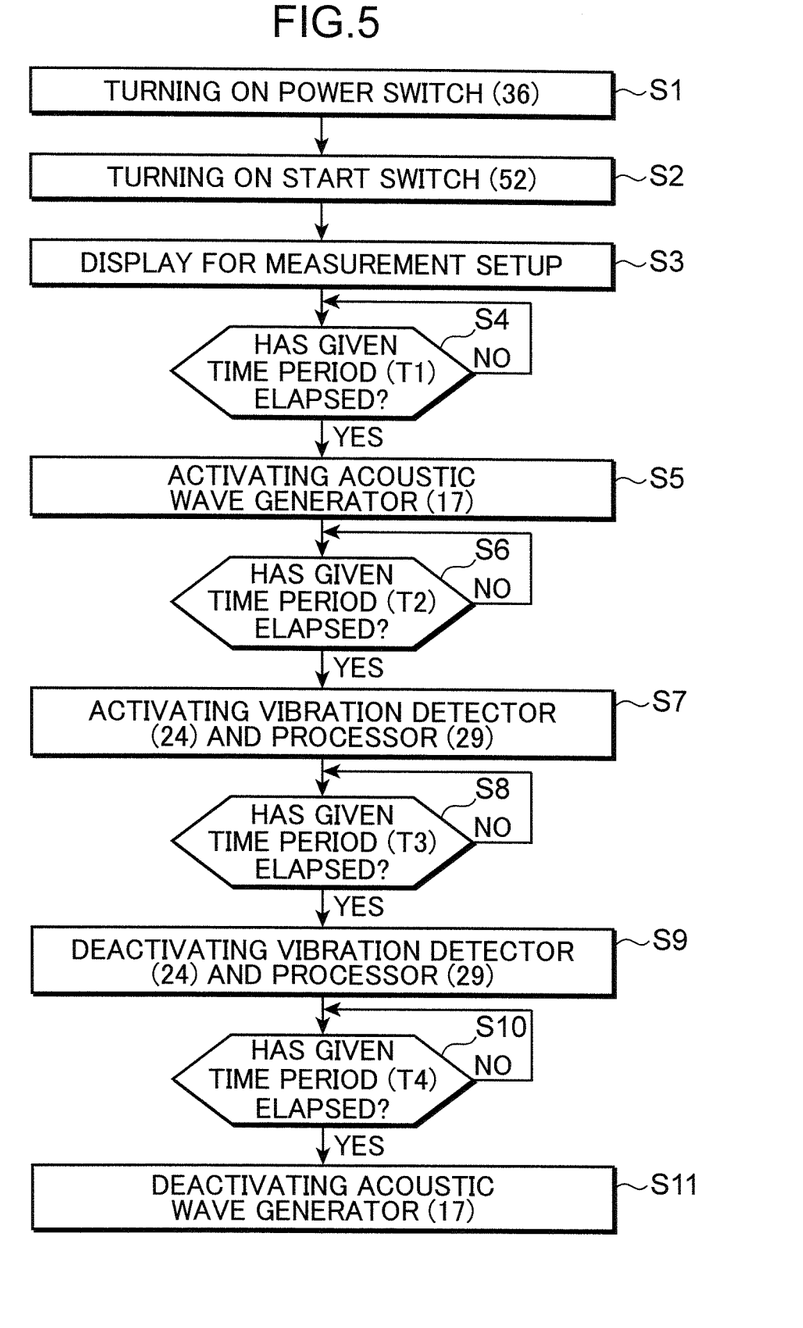
FIG. 5 is a flowchart illustrating a control process to be performed by the membrane tension measuring apparatus.
Figure 6:
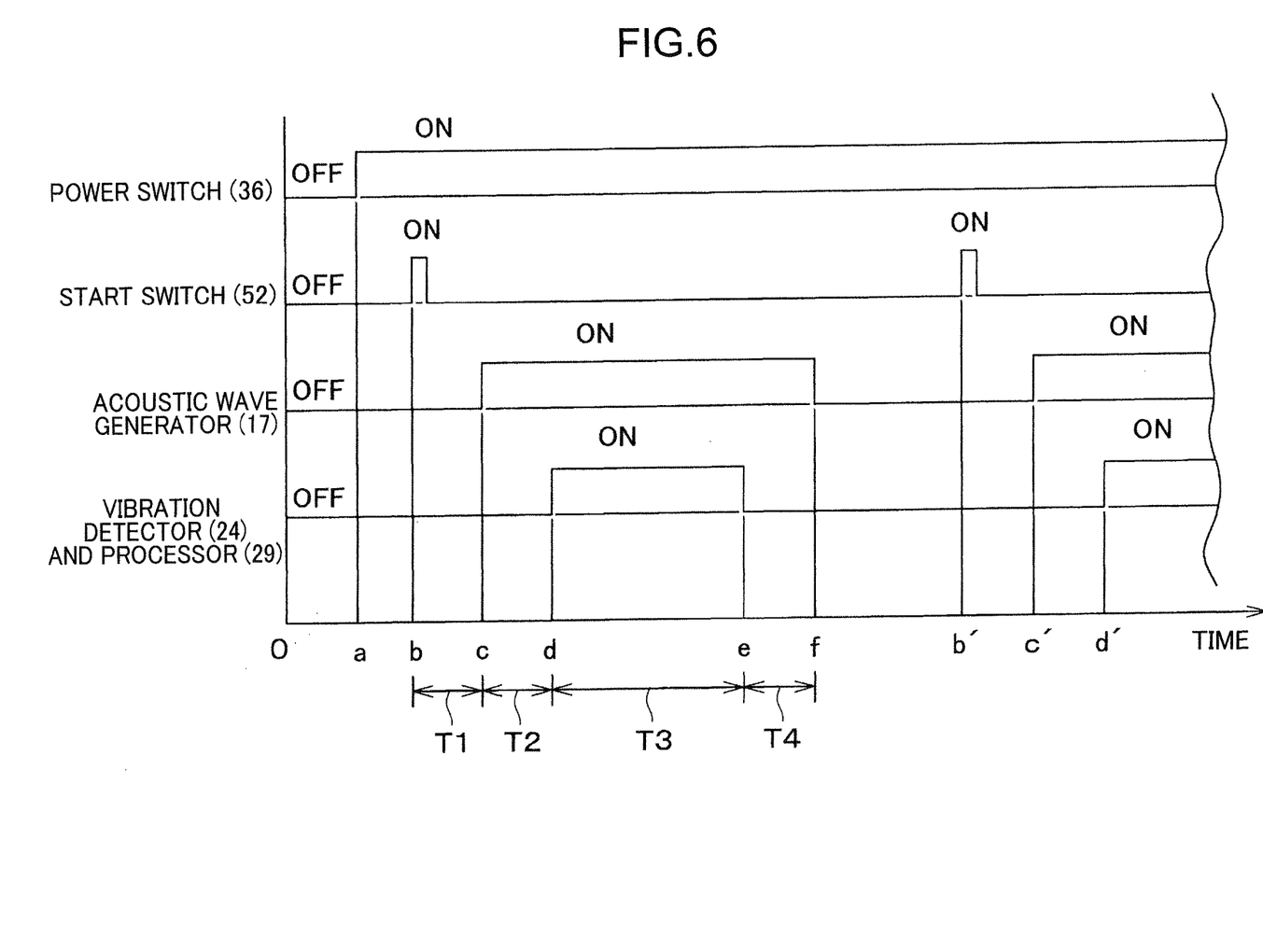
FIG. 6 is a time chart of a tension measurement task using the membrane tension measuring apparatus.

With reference to FIGS. 5 and 6, a task sequence to be performed when the measurer 13 measures the tensions Tx, Ty of the membrane 2 using the membrane tension measuring apparatus 3, will be described below. FIG. 5 illustrates a control flow according to the processor 29 of the membrane tension measuring apparatus 3, wherein S denotes each step of a program. FIG. 6 illustrates a time chart along the flowchart in FIG. 5.

Firstly, the lower end of the frame 5 is placed to abut on the upper region of the surface 4 of the membrane 2, as indicated by the solid lines in FIGS. 1 to 3, and then the power switch 36 is turned on (Step S1 in FIG. 5, Time a in FIG. 6). Then, the start switch 52 is turned on (Step S2 in FIG. 5, Time b in FIG. 6). In response to this manual operation, a display for measurement setup is effected in the display section 53 of the membrane tension measuring apparatus 3 (Step S3 in FIG. 5). The display includes, for example, a serial number for the measurement task, date/time, types (e.g., A to C types) of the candidate membranes 2, and a posture of the frame 5. For example, on an assumption that one of directions along the surface 4 of the membrane 2 is defined as an x direction, the term "posture of the frame 5" means a posture where the short side of the frame 5 is set to be parallel to the x direction ("first posture" indicated by the solid lines in FIGS. 1 to 3), etc.

Further, in connection with the above manual operation of turning on the start switch 52, after an elapsed of a given time period T1 from the turn-on of the start switch 52 (Step S4 in FIG. 5), the acoustic wave generator 17 starts operating automatically (Step S5 in FIG. 5, Time c in FIG. 6).

Specifically, the vibrating element 21 of the acoustic wave generator 17 starts vibrating according to a given electrical signal from the central control unit 33, and the resulting vibration is transmitted to the flat panel 20. Then, according to the transmitted vibration, the flat panel 20 emits an acoustic wave 16 which is white noise, in a given frequency range of 500 Hz or less. Then, in response to receiving the acoustic wave 16, a part 2a of the membrane 2 starts vibrating. In this case, a "vibration area" of the membrane 2 adapted to vibrate according to the acoustic wave 16, as one of the initial conditions, corresponds to a first part 2a of the membrane 2 defined by the frame 5 set to the "first posture". In the illustrated embodiment, the first part 2a has a short side with a length $a_1$, and a long side with a length $b_1$.

Then, after an elapsed of a given time period T2 from the activation of the acoustic wave generator 17 (Step S6 in FIG. 5), the vibration detector 24 starts operating (is activated) automatically (Step S7 in FIG. 5, Time d in FIG. 6). Specifically, according to a control signal from the central control unit 33, the vibration detector 24 starts radiating laser light to the first part 2a of the membrane 2, using the battery 45 as a power source. The radiated laser light is reflected by the first part 2a of the membrane 2 which is vibrating, and the reflected light is input into the sensor head 25. The sensor head 25 detects a change in wavelength of the reflected light based on the Doppler effect, and detects natural vibration which is induced in the first part 2a of the membrane 2 by the acoustic wave 16 emitted from the flat panel 20 of the acoustic wave generator 17 in the given frequency range (0 to 500 Hz).

In this process, the vibration detector 24 operates only when the acoustic wave generator 17 is in operation. In other words, the vibration detector 24 is adapted to operate on condition that the acoustic wave generator 17 is in operation. The start of the operation of the vibration detector 24 may be set to coincide with the start of the operation of the acoustic wave generator 17 (Step S5 in FIG. 5, Time c in FIG. 6).

Subsequently, vibration data comprising natural vibration of the first part 2a of the membrane 2 detected by the vibration detector 24 is input into the processor 29, and the processor 29 starts operating (is activated) automatically (Step S7 in FIG. 5, Time d in FIG. 6). In the course of inputting the vibration data from the vibration detector 24 into the processor 29, a part of the vibration data assumed to be caused by hand jiggling of the measurer 13 during the measurement task, i.e., a component of the natural vibration having a vibration frequency equal to or less than a given lower limit value (20 Hz), is filtered out (removed) through the low-pass filter 41.

Then, with respect to each vibration frequency of the natural vibration greater than the lower limit vibration frequency, a vibration intensity (dB) representable as a spectrum is calculated by the processor 29 using FFT (Fast Fourier Transform). There is a possibility that the vibration intensity has a plurality of local peak values at respective different vibration frequencies in the natural vibration. In this case, one in the vibration frequencies each having the peak value, the vibration frequency corresponding to a largest one of the peak values, is selected as a resonant (natural) vibration frequency. Then, this vibration frequency, i.e., a result of the calculation, is stored as a fundamental vibration frequency $f_1$ of the resonant (natural) vibration.

After the vibration detector 24 and the processor 29 operate only for a given time period T3 (Step S8 in FIG. 5), they are deactivated (Step S9 in FIG. 5, Time e in FIG. 6). Then, after an elapse of a given time T4 of about 0.5 seconds from the deactivation of the vibration detector 24 and the processor 29 (Step S10 in FIG. 5), the acoustic wave generator 17 is deactivated (Step S11 in FIG. 5, Time f in FIG. 6). The given time periods T1, T2, T3 may be arbitrarily set individually in such a manner that a total time period of them falls within 10 seconds.

Secondly, the frame 5 is rotationally displaced about the axis 6 thereof by 90°, so that it is set to a "second posture", as indicated by the chain lines in FIG. 1. In this state, the start switch 52 is turned on (Step S2 in FIG. 5, Time b' in FIG. 6), while placing the frame 5 to abut on the upper region of the surface 4 of the membrane 2. Then, in the same manner as above, the acoustic wave generator 17, the vibration detector 24 and the processor 29 start operating in sequence under automatic control of the processor 29.

In this case, the "vibration area" of the membrane 2 adapted to vibrate according to the acoustic wave 16, as one of the initial conditions, corresponds to a second part of the membrane 2 defined by the frame 5 set to the "second posture". In the illustrated embodiment, the "second part" has a long side with a length $a_2$, and a short side with a length $b_2$. Then, in the same manner as above, in the processor 29, a specific frequency of a natural vibration having a largest value of vibration intensity is selected, and the selected frequency, i.e., a result of the calculation, is stored as a fundamental vibration frequency $f_2$ of the resonant (natural) vibration in the second part.

The above initial conditions and calculation results will be organized as follows.

$\rho k$ (kg/m$^2$): a per-unit area mass of a candidate membrane for the measurement $a_1$ (cm): a short-side length of a "vibration area" having a fundamental vibration frequency $f_1$ of resonant vibration $b_1$ (cm): a long-side length of the "vibration area" having the fundamental vibration frequency $f_1$ of the resonant vibration $a_2$ (cm): a long-side length of a "vibration area" having a fundamental vibration frequency $f_2$ of resonant vibration $b_2$ (cm): a short-side length of the "vibration area" having the fundamental vibration frequency $f_2$ of the resonant vibration $f_1$ (Hz): a fundamental vibration frequency of resonant vibration in a membrane as measured in the vibration area of $a_1 \times b_1$ (indicated by the solid lines in FIGS. 1 to 3)

$f_2$ (Hz): a fundamental vibration frequency of resonant vibration in the membrane as measured in the vibration area of $a_2 \times b_2$ (indicated by the chain lines in FIG. 1)

Based on the initial conditions and calculation results, the tensions Tx, Ty are calculated by the processor 29 using FFT (Fast Fourier Transform). As a calculation formula therefor, the following Formulas (1) and (2) are used, and the following Formulas (3) and (4) obtained by expanding the Formula (I) is also used.

Tension Tx (N/cm): a unit-per length tension in the x direction

Tension Ty (N/cm): a unit-per length tension in the y direction $$\{T\} = [A]^{-1}\{f\} \tag{1}$$

$$\{T\} = \begin{Bmatrix} T_x \\ T_y \end{Bmatrix}, [A] = \begin{bmatrix} \dfrac{1}{a_1^2} & \dfrac{1}{b_1^2} \\ \dfrac{1}{a_2^2} & \dfrac{1}{b_2^2} \end{bmatrix}, \{f\} = 4\rho_k \begin{Bmatrix} f_1^2 \\ f_2^2 \end{Bmatrix} \tag{2}$$

$$T_x(\text{N/cm}) = \frac{4\rho_k a_1^2 a_2^2 (b_2^2 f_1^2 - b_1^2 f_2^2)}{a_2^2 b_1^2 - a_1^2 b_2^2} \tag{3}$$

$$T_y(\text{N/cm}) = \frac{4\rho_k b_1^2 b_2^2 (a_2^2 f_2^2 - a_1^2 f_1^2)}{a_2^2 b_1^2 - a_1^2 b_2^2} \tag{4}$$

Upon completion of the calculation of the tensions Tx, Ty by the processor 29, measurement data including the calculation results and the initial conditions is stored in the processor 29, in such a manner that it can be displayed auditorily and/or visually on the display section 53 of the processor 29. Further, the measurement data is transmitted to the receiver 56 via the wireless module 57 and the transmitting/receiving unit 58, and stored in the receiver 56, in such a manner that it can be displayed auditorily and/or visually on the display section 59 of the receiver 56. A measurement result such as values of the tensions Tx, Ty will be utilized for adequate maintenance of the membrane 2 in the building 1.

In the membrane tension measuring apparatus 3 according to this embodiment, each of the acoustic wave generator 17, the vibration detector 24 and the processor 29 is mounted to the frame 5.

Therefore, in a measurement task for measuring the tensions Tx, Ty in the membrane 2 by using the membrane tension measuring apparatus 3, the measurer 13 can carry out the measurement task while supporting some region of the membrane tension measuring apparatus 3. In other words, it is not necessary to support the components of the membrane tension measuring apparatus 3 individually during the measurement task. Thus, handling of the membrane tension measuring apparatus 3 during the measurement task becomes easy, which makes it possible to easily carry out the measurement task.

In this embodiment, the acoustic wave generator 17 is comprised of the flat-panel speaker having the flat panel 20 which is operable to emit the acoustic wave 16 in accordance with an electrical signal, while being disposed to extend parallel to the part 2a of the membrane 2.

During the operation for causing the part 2a of the membrane 2 to vibrate by the acoustic wave generator 17, it is preferable to allow the part 2a of the membrane 2 to vibrate as more uniformly as possible therethroughout. In this regard, as compared to a cone-type speaker in which an acoustic wave spreads in a radial pattern, the flat panel 20 of the acoustic wave generator 17 is an acoustic source having a wider area and capable of emitting a planar acoustic wave 16.

Thus, even if the flat panel 20 is disposed close to the part 2a of the membrane 2 to some extent during the measurement task, the acoustic wave 16 emitted from the flat panel 20 as an acoustic source having a wider area can cause the part 2a of the membrane 2 to more uniformly vibrate therethroughout. Therefore, the flat panel 20 can be disposed closer to the part 2a of the membrane 2, which makes it possible to reduce the size and weight of the membrane tension measuring apparatus 3 and thereby more easily carry out the measurement task using the membrane tension measuring apparatus 3.

In this embodiment, the short side and the long side of the flat panel 20 is disposed to extend parallel to respective ones of the short side and the long side defining inner dimensions of the frame 5.

Therefore, even if the flat panel 20 is disposed closer to the part 2a of the membrane 2, the flat panel 20 can cause the part 2a of the membrane 2 to uniformly vibrate therethroughout. Thus, the flat panel 20 can be disposed closer to the membrane 2, which makes it possible to further reduce the size and weight of the membrane tension measuring apparatus 3.

In this embodiment, the acoustic wave generator 17 is adapted, in response to a manual operation for activating the acoustic wave generator 17, to start operating to emit the acoustic wave 16, and the vibration detector 24 is adapted to automatically detect vibration which is induced in the part 2a of the membrane 2 by the emitted acoustic wave 16. Further, the processor 29 is adapted to automatically calculate the tensions Tx, Ty based on the vibration data detected by the vibration detector 24, and automatically store a measurement result including the vibration data and a result of the calculation, while arbitrarily displaying the measurement result on the display section 53.

Therefore, in the measurement task using the membrane tension measuring apparatus 3, it is only necessary to place the frame 5 to abut on the surface 4 of the membrane 2 and then activate the acoustic wave generator 17. In response to this manual operation, a measurement result of the measurement task can be automatically stored in the membrane tension measuring apparatus 3, and the stored measurement result can be displayed. This makes it possible to arbitrarily know the stored content.

Thus, there is no need for the measurer 13 to remember or write down the measurement result during the measurement task. This allows the measurement task to be easily carried out even if a field of the measurement task is a high location. As a first option, the content of the measurement result may be displayed by the membrane tension measuring apparatus 3 at a location away from the field of the measurement task and convenient for operation, such as an office. As a second option, the membrane tension measuring apparatus 3 may be connected to a terminal, such as a personal computer, to upload the data to the terminal so as to obtain the data in the form of a text file. This makes it possible to easily known the measurement result after completion of the measurement task.

In this embodiment, an output (dB) level of the acoustic wave 16 to be emitted from the acoustic wave generator 17 can be adjusted.

In the membrane tension measuring apparatus 3, power consumption of the acoustic wave generator 17 is greater than that of other component such as the vibration detector 24 or the processor 29. Therefore, the output (dB) level of the acoustic wave 16 to be emitted from the acoustic wave generator 17 may be set to a required minimum value suitable for a value of the per-unit area mass $\rho_k$ (kg/m$^2$) of the membrane 2. This makes it possible to prevent unnecessary power consumption. Thus, it becomes possible to suppress the power consumption of the membrane tension measuring apparatus 3. In addition, it becomes possible to increase a possibility that a power source for the acoustic wave generator 17, the vibration detector 24 and the processor 29 is made up of the batteries 35, 45 without relying on the external power source 49 such as a commercial power source, and provide enhanced flexibility of selection of the power source.

In this embodiment, the vibration detector 24 is adapted to operate only when the acoustic wave generator 17 is in operation.

This makes it possible to prevent unnecessary power consumption occurring in a situation where the vibration detector 24 operates when the acoustic wave generator 17 is in non-operation. Thus, it becomes possible to suppress the power consumption of the membrane tension measuring apparatus 3.

In this embodiment, the processor 29 is adapted to start operating (d in FIG. 6) after the elapse of the given time T2 from start (c in FIG. 6) of the operation of the acoustic wave generator 17.

When the measurer 13 carries out the measurement task using the membrane tension measuring apparatus 3, hand jiggling of the measurer 13 is apt to occur initially after the frame 5 is placed to abut on the surface 4 of the membrane 2. Particularly, in cases where the frame 5 is placed to abut on a lower region of the surface 4 of the membrane 2, as indicated by the chain lines in FIGS. 2 and 3, the hand jiggling is likely to significantly occur.

Therefore, the processor 29 is adapted to start operating (d in FIG. 6) after the elapse of the given time T2 from start (c in FIG. 6) of the operation of the acoustic wave generator 17, so that it becomes possible to prevent the tensions from being calculated based on vibration data including vibration caused by the hand jiggling, so as to perform the measurement with a higher degree of accuracy. Thus, this measurement task can be carried out with little regard for an influence of the hand jiggling during the operation of placing the frame 5 to abut on the surface 4 of the membrane 2, which makes it possible to perform the measurement more easily and accurately.

In this embodiment, a power source for the acoustic wave generator 17, the vibration detector 24 and the processor 29 is made up of the batteries 35, 45.

If the membrane tension measuring apparatus 3 is connected to the external power source 49, such as a commercial power source, via an electric wire, an unnecessary external force is likely to be applied to the membrane tension measuring apparatus 3 through the electric wire. In this embodiment, the power source is made up of the batteries 35, 45 as mentioned above, so that it becomes possible to prevent such an external force from being applied to the membrane tension measuring apparatus 3. This allows the handling of the membrane tension measuring apparatus 3 to become easier and more accurate.

Moreover, if the external AC power source 49 such as a commercial power source is used as the power source, a frequency (50 Hz or 60 Hz) of the AC power source completely unrelated to the resonant (natural) frequency of the membrane 2 is likely to appear as one spectrum as a result obtained by subjecting an output of the vibration detector 24 to FFT. This phenomenon is undesirably because it has an adverse effect on a result of the measurement using the membrane tension measuring apparatus 3. In contrast, when the power source for the acoustic wave generator 17, the vibration detector 24 and the processor 29 is made up of the batteries 35, 45, the occurrence of the problem due to use of the AC power source can also be avoided.

Further, the acoustic wave generator 17 is a flat-panel speaker which is capable of efficiently vibrating with power consumption less than that in a cone-type speaker. Therefore, it can sufficiently operate only by electric power supply from the batteries 35, 45, without a need for supplying a large amount of electric power from the external power source 49 to the membrane tension measuring apparatus 3. Thus, based on employing a flat-panel speaker as the acoustic wave generator 17, it becomes possible to eliminate a need for an electric wire for electric power supply from the external power source 49, and allow the handling of the membrane tension measuring apparatus 3 to become easier, while providing enhanced accuracy.

In this embodiment, the processor 29 is operable to calculate the tensions Tx, Ty based on vibration data obtained by filtering out a low-frequency component equal to or less than a given value, from vibration detected by the vibration detector 24.

When the measurer 13 carries out the measurement task using the membrane tension measuring apparatus 3, hand jiggling of the measurer 13 as low-frequency vibration is apt to occur initially after the frame 5 is placed to abut on the surface 4 of the membrane 2.

Therefore, the processor 29 is configured to calculate the tensions Tx, Ty based on vibration data obtained by filtering out a low-frequency component equal to or less than a given value, so that it becomes possible to prevent the tensions from being calculated based on vibration data including vibration caused by the hand jiggling, so as to perform the measurement with a higher degree of accuracy. Thus, this measurement task can be carried out with little regard for an influence of the hand jiggling during the operation of placing the frame 5 to abut on the surface 4 of the membrane 2, which makes it possible to perform the measurement more easily and accurately.

In this embodiment, measurement data including the calculation result from the processor 29 can be wirelessly transmitted to the receiver 56 located away from the processor 29, and the receiver 56 has the display section 59 adapted to display the measurement data.

Therefore, even if the measurement task using the membrane tension measuring apparatus 3 is carried out at a high location or a location with poor footing in the building 1, etc., the measurement result of the membrane tension measuring apparatus 3 can be monitored in real time at a desired location, such as a location with good footing, by use of the display section 59 of the receiver 56. Thus, a load of the measurement task in the field is reduced, so that the measurement task can be carried out more easily and smoothly.

In this embodiment, the membrane tension measuring apparatus 3 is designed such that it is automatically deactivated when the start switch 52 is not turned on within a given time period after the power switch 36 is turned on. This makes it possible to prevent unnecessary power consumption.

Although the above description has been made based on the illustrated embodiment, various modifications may be made therein as follows. For example, the part 2a of the membrane 2 may be disposed to extend vertically or obliquely. Further, the frame 5 may have a square shape. The mounting of each of the acoustic wave generator 17 and other components to the frame 5 may be either one of direct and indirect types. The acoustic wave generator 17 may be a cone-type speaker. The start switch 52 for the processor 29 may be directly mounted to the housing 31. The calculation of the tensions Tx, Ty based on respective ones of the resonant vibration frequencies $f_1$, $f_2$ may be performed based on a map regarding a relationship between $f_1$, $f_2$ and Tx, Ty, pre-stored in the processor 29.

An outline of the above embodiment is as follows.

(1) The membrane tension measuring apparatus according to the above embodiment comprises a rectangular frame 5 adapted to be abuttable on a surface 4 of a membrane 2 to which tension Tx, Ty is applied, an acoustic wave generator 17 operable to emit an acoustic wave 16 toward a part 2a of the membrane 2 surrounded by the frame 5, a vibration detector 24 operable to detect vibration which is induced in the part 2a of the membrane 2 by the emitted acoustic wave 16, and a processor 29 operable to calculate the tension Tx, Ty based on vibration data detected by the vibration detector 24. In the membrane tension measuring apparatus, each of the acoustic wave generator 17, the vibration detector 24 and the processor 29 is mounted to the frame 5.

Therefore, in a measurement task for measuring the tension applied to the membrane, a measurer can carry out the measurement task while supporting some region of the membrane tension measuring apparatus. In other words, it is not necessary to support the components of the membrane tension measuring apparatus individually. Thus, handling of the membrane tension measuring apparatus during the measurement task becomes easy, which makes it possible to easily carry out the measurement task.

(2) The acoustic wave generator 17 may be a flat-panel speaker having a flat panel 20 which is operable to emit the acoustic wave 16 in accordance with an electrical signal, while being provided to be parallel to the part 2a of the membrane 2.

During the operation for causing the part of the membrane to vibrate by the acoustic wave generator, it is preferable to allow the part of the membrane to vibrate as uniformly as possible therethroughout. In this regard, as compared to a cone-type speaker in which an acoustic wave spreads in a radial pattern, the flat panel of the acoustic wave generator is an acoustic source having a wider area and capable of emitting a planar acoustic wave.

Thus, even if the flat panel is disposed close to the part of the membrane to some extent during the measurement task, the acoustic wave emitted from the flat panel as an acoustic source having a wider area can cause the part of the membrane to more uniformly vibrate therethroughout. Therefore, the flat panel can be disposed closer to the part of the membrane, which makes it possible to reduce the size and weight of the membrane tension measuring apparatus and thereby more easily carry out the measurement task using the membrane tension measuring apparatus.

(3) The acoustic wave generator 17 may be adapted, in response to a operation for activating the acoustic wave generator 17, to start operating to emit the acoustic wave 16, and the vibration detector 24 may be adapted to automatically detect vibration which is induced in the part 2a of the membrane 2 by the emitted acoustic wave 16. Further, the processor 29 may be adapted to automatically calculate the tension Tx, Ty based on the vibration data detected by the vibration detector 24, and automatically store a measurement result including the vibration data and a result of the calculation, while displaying the measurement result on a display section 53.

In a measurement task using the membrane tension measuring apparatus, it is only necessary to place the frame to abut on the surface of the membrane and then activate the acoustic wave generator. In response to this manual operation, the measurement result from the measurement task can be automatically stored in the membrane tension measuring apparatus, and the stored measurement result can be displayed. This makes it possible to arbitrarily know the stored content.

Thus, there is no need for a measurer to remember or write down the measurement result during the measurement task. Therefore, even if a field of the measurement task is a high location, the measurement task can be easily carried out. As a first option, the content of the measurement result may be displayed by the membrane tension measuring apparatus at a location away from the field of the measurement task and convenient for operation, such as an office. As a second option, the membrane tension measuring apparatus may be connected to a terminal, such as a personal computer, to upload the data to the terminal so as to obtain the data in the form of a text file. This makes it possible to easily known the measurement result after completion of the measurement task.

(4) The membrane tension measuring apparatus may be designed to be capable of adjusting an output (dB) level of the acoustic wave 16 to be emitted from the acoustic wave generator 17.

In the membrane tension measuring apparatus, power consumption of the acoustic wave generator is greater than that of the vibration detector or the processor. Therefore, in cases where an output level of the acoustic wave to be emitted from the acoustic wave generator can be adjusted, the output level of the acoustic wave to be emitted from the acoustic wave generator may be set to a required minimum value suitable for a value of a per-unit area mass of the membrane. This makes it possible to prevent unnecessary power consumption. Thus, it becomes possible to suppress power consumption of the membrane tension measuring apparatus. In addition, it becomes possible to increase a possibility that a power source for the acoustic wave generator, the vibration detector and the processor is made up of a battery without relying on an external power source such as a commercial power source, and provide enhanced flexibility of selection of the power source.

(5) The vibration detector 24 may be adapted to operate on condition that the acoustic wave generator 17 is in operation.

This feature makes it possible to prevent unnecessary power consumption occurring in a situation where the vibration detector operates when the acoustic wave generator is in non-operation. Thus, it becomes possible to suppress the power consumption of the membrane tension measuring apparatus.

(6) The processor 29 may be adapted to start operating (d in FIG. 6) after an elapse of a given time T2 from start (c in FIG. 6) of an operation of the acoustic wave generator 17.

When a measurer carries out the measurement task using the membrane tension measuring apparatus, hand jiggling of the measurer is apt to occur initially after the frame is placed to abut on the surface of the membrane. Particularly, in cases where the frame is placed to abut on a lower region of the surface of the membrane, the hand jiggling is likely to significantly occur.

Therefore, the processor is configured to automatically start operating after the elapse of the given time from the start of the operation of the acoustic wave generator, so that it becomes possible to prevent the tension from being calculated based on vibration data including vibration caused by the hand jiggling, so as to perform the measurement with a higher degree of accuracy. Thus, this measurement task can be carried out with little regard for an influence of the hand jiggling during the operation of placing the frame to abut on the surface of the membrane, which makes it possible to perform the measurement more easily and accurately.

(7) A power source for the acoustic wave generator 17, the vibration detector 24 and the processor 29 may be a battery 35, 45.

If the membrane tension measuring apparatus is connected to an external power source via an electric wire, an unnecessary external force is likely to be applied to the membrane tension measuring apparatus through the electric wire. According to the above feature, the power source is a battery, so that it becomes possible to prevent such an external force from being applied to the membrane tension measuring apparatus. This allows the handling of the membrane tension measuring apparatus to become easier and more accurate.

Moreover, if an external AC power source such as a commercial power source is used as the power source for the acoustic wave generator, the vibration detector and the processor, a frequency of the AC power source completely unrelated to a resonant (natural) frequency of the membrane is likely to appear as one spectrum as a result obtained by subjecting an output of the vibration detector to FFT. This phenomenon is undesirably because it has an adverse effect on a result of the measurement using the membrane tension measuring apparatus. In contrast, when the power source for the acoustic wave generator, the vibration detector and the processor is a battery, the occurrence of the problem due to use of the AC power source can also be avoided.

(8) The processor 29 may be operable to calculate the tension Tx, Ty based on vibration data obtained by filtering out a low-frequency component equal to or less than a given value, from vibration detected by the vibration detector 24.

When a measurer carries out the measurement task using the membrane tension measuring apparatus, hand jiggling of the measurer as low-frequency vibration is apt to occur initially after the frame is placed to abut on the surface of the membrane.

Therefore, the processor is configured to calculate the tension based on vibration data obtained by filtering out a low-frequency component equal to or less than a given value. In this case, it becomes possible to prevent the tension from being calculated based on vibration data including vibration caused by the hand jiggling, so as to perform the measurement with a higher degree of accuracy. Thus, this measurement task can be carried out with little regard for an influence of the hand jiggling during the operation of placing the frame to abut on the surface of the membrane, which makes it possible to perform the measurement more easily and accurately.

(9) When the membrane tension measuring apparatus comprises a wireless module 57 operable to wirelessly transmit measurement data including the calculation result from the processor 29, and a receiver 56 located away from the processor 29 and operable to receive the measurement data transmitted from the wireless module 57, the receiver 56 may have a display section 59 adapted to display the received measurement data.

According to this embodiment, even if the measurement task using the membrane tension measuring apparatus is carried out at a high location or a location with poor footing in a building, etc., the measurement result of the membrane tension measuring apparatus can be monitored in real time at a desired location, such as a location with good footing, by use of the display section of the receiver. Thus, a load of the measurement task in the field is reduced, so that the measurement task can be carried out more easily and smoothly.

The numeral or code or the drawing number appended to each term is added as a reference, but not intended to limit a technical scope of the present invention to contents of the description and the drawings.

The present invention is applicable to an apparatus for measuring tension in a membrane provided in not only a building but also a roof of an open-air stage, a monument, etc.

What is claimed is:
1. A membrane tension measuring apparatus comprising:
   a rectangular frame adapted to be abuttable on a surface of a membrane to which tension is applied;
   an acoustic wave generator operable to emit an acoustic wave toward a part of the membrane surrounded by the frame;
   a vibration detector operable to detect vibration which is induced in the part of the membrane by the emitted acoustic wave; and a processor operable to calculate the tension based on vibration data detected by the vibration detector, wherein each of the acoustic wave generator, the vibration detector and the processor is mounted to the frame, and wherein the acoustic wave generator is a flat-panel speaker having a flat panel which is operable to emit the acoustic wave in accordance with an electrical signal, while being provided to be parallel to the part of the membrane.

2. The membrane tension measuring apparatus as defined in claim 1, wherein a short side of the flat panel is disposed to extend parallel to a short side of the frame and a long side of the flat panel is disposed to extend parallel to a long side of the frame.

3. The membrane tension measuring apparatus as defined in claim 1, wherein:

the acoustic wave generator is adapted, in response to a operation for activating the acoustic wave generator, to start operating to emit the acoustic wave;

the vibration detector is adapted to automatically detect vibration which is induced in the part of the membrane by the emitted acoustic wave; and the processor is adapted to automatically calculate the tension based on the vibration data detected by the vibration detector, and automatically store a measurement result including the vibration data and a result of the calculation, while displaying the measurement result on a display section.

4. The membrane tension measuring apparatus as defined in claim 1, which is designed to be capable of adjusting an output level of the acoustic wave to be emitted from the acoustic wave generator.

5. The membrane tension measuring apparatus as defined in claim 1, wherein the vibration detector is adapted to operate on condition that the acoustic wave generator is in operation.

6. The membrane tension measuring apparatus as defined in claim 1, wherein the processor is adapted to start operating after an elapse of a given time from start of an operation of the acoustic wave generator.

7. The membrane tension measuring apparatus as defined in claim 1, wherein a power source for the acoustic wave generator, the vibration detector and the processor is a battery.

8. The membrane tension measuring apparatus as defined in claim 1, wherein the processor is operable to calculate the tension based on vibration data obtained by filtering out a low-frequency component equal to or less than a given value, from vibration detected by the vibration detector.

9. The membrane tension measuring apparatus as defined in claim 1, which comprises:

a wireless module operable to wirelessly transmit measurement data including the calculation result from the processor; and a receiver located away from the processor and operable to receive the measurement data transmitted from the wireless module, the receiver having a display section adapted to display the received measurement data.

10. The membrane tension measuring apparatus as defined in claims 1, wherein the vibration detector includes a sensor head which is disposed between the part of the membrane surrounded by the rectangular frame and the acoustic wave generator.

* * * * *